(12) United States Patent
Kitazawa et al.

(10) Patent No.: US 11,681,397 B2
(45) Date of Patent: Jun. 20, 2023

(54) POSITION DETECTION SYSTEM, POSITION DETECTION APPARATUS, AND POSITION DETECTION METHOD

(71) Applicant: SEIKO EPSON CORPORATION, Tokyo (JP)

(72) Inventors: Takayuki Kitazawa, Suwa (JP); Yuma Iwahara, Matsumoto (JP)

(73) Assignee: Seiko Epson Corportation, Tokyo (JP)

( * ) Notice: Subject to any disclaimer, the term of this patent is extended or adjusted under 35 U.S.C. 154(b) by 23 days.

(21) Appl. No.: 17/341,439

(22) Filed: Jun. 8, 2021

(65) Prior Publication Data

US 2021/0382575 A1     Dec. 9, 2021

(30) Foreign Application Priority Data

Jun. 8, 2020   (JP) .............................. JP2020-099360

(51) Int. Cl.
| | | |
|---|---|---|
| *G06F 3/042* | (2006.01) | |
| *G06T 7/70* | (2017.01) | |
| *G06N 3/08* | (2023.01) | |

(52) U.S. Cl.
CPC ............ *G06F 3/0425* (2013.01); *G06N 3/08* (2013.01); *G06T 7/70* (2017.01); *G06T 2207/20072* (2013.01); *G06T 2207/20081* (2013.01)

(58) Field of Classification Search
CPC ....... G06F 3/0425; G06F 3/0421; G06N 3/08; G06N 3/04; G06T 7/70;

(Continued)

(56) References Cited

U.S. PATENT DOCUMENTS

| | | | |
|---|---|---|---|
| 2011/0211760 A1* | 9/2011 | Boncyk | G06F 16/583 382/218 |
| 2012/0062736 A1 | 3/2012 | Xiong | |

(Continued)

FOREIGN PATENT DOCUMENTS

| | | |
|---|---|---|
| JP | 2015-222591 A | 12/2015 |
| JP | 2016-53768 A | 4/2016 |

(Continued)

OTHER PUBLICATIONS

Tensor Flow User Group "TFUG" Introduction of State-of-the-Art Deep Learning Techniques for Embedded Devices About Quantization technique and DorefaNet, PowerPoint, Pasona Tech, Inc., West Japan Branch, Natsutani, Dec. 21, 2017—28 pages.

*Primary Examiner* — Grant Sitta
(74) *Attorney, Agent, or Firm* — Dority & Manning, P.A.

(57) ABSTRACT

A position detection system includes a position detection apparatus and a server. The position detection apparatus includes an imaging apparatus that captures an image of an operation surface, a processor that detects a pointed position at which a pointing element is pointing on the operation surface by using a learned model based on captured images captured by the imaging apparatus, and a first communication apparatus that transmits the captured images to the server apparatus. The server apparatus includes at least one processor that detects a first image that does not contain an image of the pointing element out of the captured images, generates learning data containing the first image, and relearns the learned model by using the learning data.

8 Claims, 8 Drawing Sheets

(58) Field of Classification Search
CPC . G06T 2207/20072; G06T 2207/20081; G06T 2207/10012; G06T 2207/20084; G06T 7/254; G06T 7/73
See application file for complete search history.

(56) References Cited

U.S. PATENT DOCUMENTS

| | | | | |
|---|---|---|---|---|
| 2013/0265228 | A1* | 10/2013 | Tamura | G06F 3/033 345/157 |
| 2014/0168062 | A1* | 6/2014 | Katz | G06F 3/167 345/156 |
| 2014/0253513 | A1* | 9/2014 | Matsubara | G06F 3/0425 345/175 |
| 2014/0294233 | A1* | 10/2014 | Osamura | G06T 7/593 382/103 |
| 2015/0324054 | A1* | 11/2015 | Kobayashi | H04B 10/1141 345/175 |
| 2016/0364007 | A1 | 12/2016 | Kamovich et al. | |
| 2017/0228033 | A1* | 8/2017 | Takimoto | G06F 3/04842 |
| 2017/0329458 | A1* | 11/2017 | Kanemaru | G06F 3/04883 |
| 2018/0120960 | A1* | 5/2018 | Uchiyama | G03B 17/54 |
| 2018/0275832 | A1* | 9/2018 | Toyooka | G06F 3/04184 |
| 2018/0307316 | A1 | 10/2018 | Chiu et al. | |
| 2021/0287058 | A1* | 9/2021 | Yoshimi | G06V 30/194 |

FOREIGN PATENT DOCUMENTS

| | | |
|---|---|---|
| JP | 2018-505455 A | 2/2018 |
| JP | 2018-149669 A | 9/2018 |
| JP | 2018-181294 A | 11/2018 |

\* cited by examiner

POSITION DETECTION SYSTEM, POSITION DETECTION APPARATUS, AND POSITION DETECTION METHOD

The present application is based on, and claims priority from JP Application Serial Number 2020-099360, filed Jun. 8, 2020, the disclosure of which is hereby incorporated by reference herein in its entirety.

BACKGROUND

1. Technical Field

The present disclosure relates to a position detection system, a position detection apparatus, and a position detection method.

2. Related Art

There has been a known apparatus that detects the position at which a pointing element is pointing on an operation surface based on a captured image produced by capturing an image of the operation surface. For example, the apparatus disclosed in JP-A-2015-222591 extracts a foreground image from captured video images, binarizes the extracted foreground image to extract a binarized foreground image, and acquires a set of pixel vertices of a minimum convex hull of the extracted binarized image. The apparatus disclosed in JP-A-2015-222591 then constructs a region of interest as a candidate region containing an operator's hand that is the pointing element at the center of each of the acquired pixel vertices of the minimum convex hull, extracts a hand image feature from the constructed regions of interest, and determines a region of interest containing the hand out of the candidate regions by using a pattern recognition method.

However, when a region of interest that is one of the hand-containing candidate regions is falsely detected, an unnecessary or incorrect process can be undesirably carried out. When the operator performs no operation but a process is carried out, the operator feels uncomfortable. The apparatus disclosed in JP-A-2015-222591 does not disclose any measures taken when the region of interest is falsely detected.

SUMMARY

An aspect that solves the problem described above relates to a position detection system including a position detection apparatus and a server apparatus. The position detection apparatus includes an imaging apparatus that captures images of a range containing an operation surface, a pointing element detector that detects a pointed position at which a pointing element is pointing on the operation surface by using a learned model based on captured images captured by the imaging apparatus, and a first communication apparatus that transmits the captured images to the server apparatus. The server apparatus includes an image detector that detects a first image containing no image of the pointing element out of the captured images received from the position detection apparatus and a learner that generates learning data containing the first image and relearns the learned model by using the generated learning data.

Another aspect that solves the problem described above relates to a position detection apparatus that detects a position at which a pointing element is pointing on an operation surface and includes an imaging apparatus that captures images of a range containing the operation surface, a pointing element detector that detects the pointed position at which the pointing element is pointing on the operation surface by using a learned model based on captured images captured by the imaging apparatus, an image detector that detects a first image containing no image of the pointing element out of the captured images, and a learner that generates learning data containing the first image and relearns the learned model by using the generated learning data.

Another aspect that solves the problem described above relates to a projector that detects a pointed position at which a pointing element is pointing on an operation surface and includes an imaging apparatus that captures images of a range containing the operation surface, a pointing element detector that detects the pointed position by using a learned model based on captured images captured by the imaging apparatus, an image detector that detects a first image containing no image of the pointing element out of the captured images, a learner that generates learning data containing the first image and relearns the learned model by using the generated learning data, and a drawing processing section that adjusts a projection image based on a result of the detection of the pointed position.

Another aspect that solves the problem described above relates to a position detection method for detecting a pointed position at which a pointing element is pointing on an operation surface and including an imaging step of capturing images of a range containing the operation surface, a pointing element detection step of detecting the pointed position by using a learned model based on captured images captured in the imaging step, an image detection step of detecting a first image containing no image of the pointing element out of the captured images, and a relearning step of generating learning data containing the first image and relearning the learned model by using the generated learning data.

DESCRIPTION OF EXEMPLARY EMBODIMENTS

Embodiments according to the present disclosure will be described below with reference to the accompanying drawings.

First Embodiment

Figure 1:
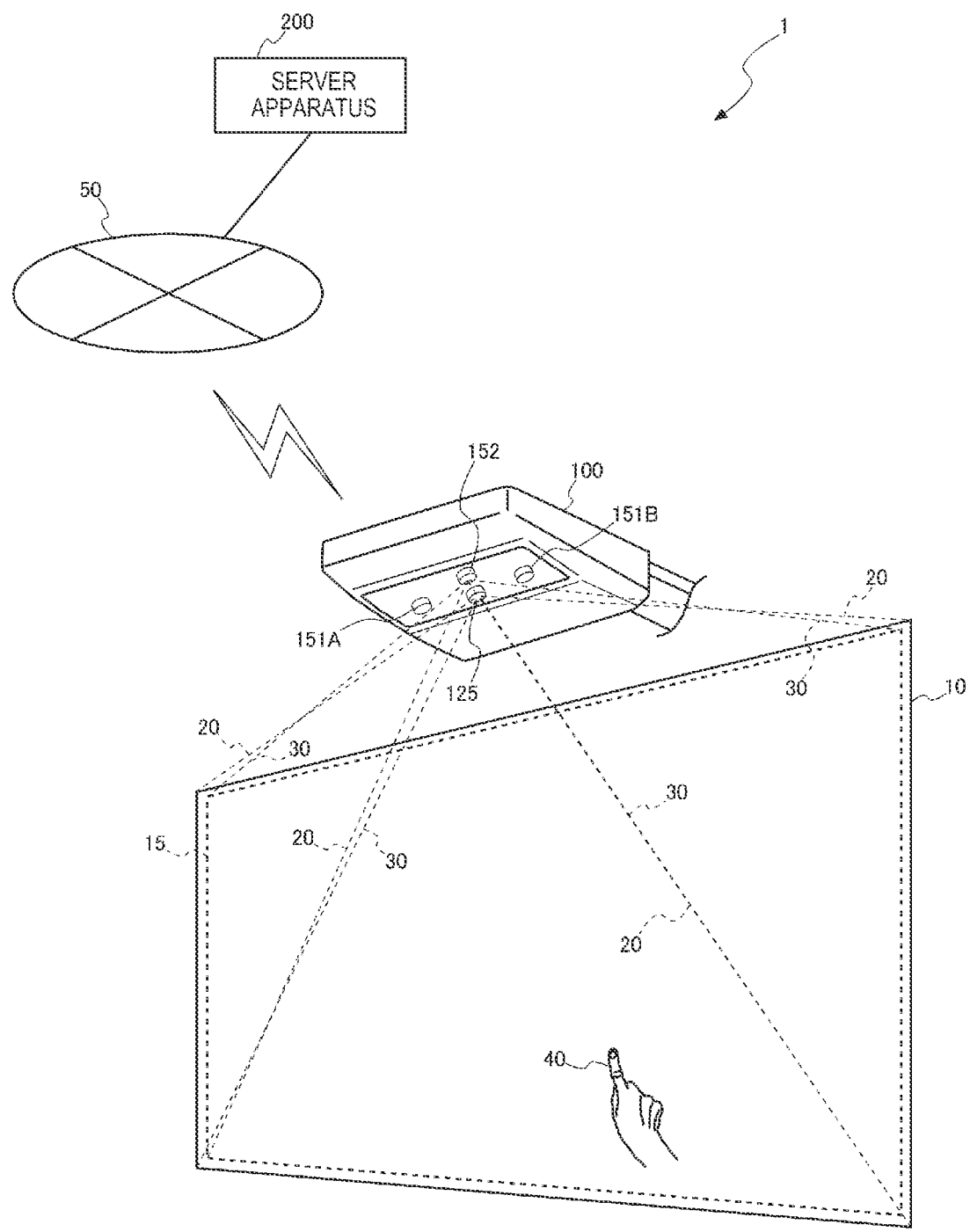
FIG. 1 shows the configuration of a position detection system.

FIG. 1 shows the configuration of a position detection system 1. The position detection system 1 includes a position detection apparatus 100 and a server apparatus 200 and has a configuration in which the apparatuses are so coupled to each other that data is communicable therebetween via a network 50. The position detection apparatus 100 detects a pointed position at which a user is pointing. The position detection apparatus 100 in FIG. 1 includes a projector and detects the position at which a pointing element 40 is pointing on a projection surface 10, on which the projector projects an image.

The position detection apparatus 100 projects image light 30, which is generated based on an image signal supplied from an external apparatus, onto the projection surface 10 via an optical unit 125. A projection image based on the image light 30 is thus displayed on the projection surface 10.

FIG. 1 shows a case where the projection surface 10 is a screen composed of a planar surface, and the projection surface 10 may instead be another planar surface, such as a wall surface. Still instead, the projection surface 10 may, for example, be a lifting-type or standing-type curtain-shaped screen.

The position detection apparatus 100 has an interactive function. The interactive function means the function of detecting a pointed position at which the pointing element 40 is pointing on an operation surface 15 and carrying out a process corresponding to the detected pointed position. The process carried out by the position detection apparatus 100 includes, for example, the function of selecting an icon displayed on the projection surface 10 or drawing an image of a letter, a symbol, a figure, or any other object on the projection surface 10. Examples of the icon include an icon for selecting a line thickness or a line color and an eraser icon for erasing a letter, a symbol, or a figure. The position detection apparatus 100 carries out a process corresponding to an icon selected by operation performed by the pointing element 40. The projection surface 10 is a surface on which the image light 30 is projected and is also used as the operation surface 15, which is a surface where operation performed by the pointing element 40 is detected.

In the position detection system 1, one or more non-luminous pointing elements 40 can be used. The pointing element 40 can be a non-luminous object, such as a finger and a pen. The non-luminous pointing element 40 is not limited to a specific object and may be any object that reflects infrared light. The present embodiment will be described with reference to a case where the pointing element 40 is a user's finger.

The position detection apparatus 100 includes an imaging apparatus 151 and a detection light irradiator 152. The imaging apparatus 151 includes a left camera 151A and a right camera 151B. The left camera 151A and the right camera 151B are located in different positions in the position detection apparatus 100, as shown in FIG. 1, and each capture an image of a range including at least part of the projection surface 10. The left camera 151A and the right camera 151B function as a stereo camera that captures an image of the range including at least part of the projection surface 10 from different imaging viewing points. In the present embodiment, the left camera 151A is located on the left of a projection apparatus 120 of the position detection apparatus 100 in correspondence with the projection surface 10, and the right camera 151B is located on the right of the projection apparatus 120 of the position detection apparatus 100 in correspondence with the projection surface 10. The number of cameras may be three or more. The position detection apparatus 100 detects the position at which the pointing element 40 is pointing based on the captured images captured by the imaging apparatus 151.

The detection light irradiator 152 radiates detection light 20 over a range including at least part of the operation surface 15. More specifically, the detection light radiator 152 radiates the detection light 20 over the range that allows the left camera 151A and the right camera 151B to capture images of light reflected off the pointing element 40 having approached the operation surface 15 and located within a predetermined distance therefrom. The detection light 20 is light used to detect the pointing element 40 and is infrared light in the present embodiment. Using infrared light as the detection light allows detection of the pointing element 40 without being affected by the image light 30, which is primarily formed of visible light, and without affecting the display operation performed by the image light 30.

The server apparatus 200 generates a learned model 160 used to detect the position at which the pointing element 40 is pointing. The learned model 160 is a model having undergone learning for detecting the position at which the pointing element 40 is pointing based on images captured by the left camera 151A and the right camera 151B, and the learned model 160 is formed of software or software and hardware. For example, the learned model 160 is a model that specifies a learned neural network expressed, for example, in the form of a set of pieces of information on the weight of the bond between neurons, which are nodes that form the neural network.

Further, the server apparatus 200 relearns the generated learned model 160. In the position detection system 1, the server apparatus 200 relearns the learned model 160 to reduce false detection of the position at which the pointing element 40 is pointing. The position detection apparatus 100 generates a captured image by capturing an image of the range including the projection surface 10 via the imaging apparatus 151, for example, when an operator presses a pre-set button on a remote control or whenever a pre-set setting period elapses. When the number of generated captured images reaches a predetermined number, the position detection apparatus 100 uploads the generated captured images to the server apparatus 200. The server apparatus 200 relearns the learned model 160 based on the captured images uploaded from the position detection apparatus 100 or captured images uploaded in the past from the position detection apparatus 100. Having completed the relearning, the server apparatus 200 downloads the relearned learned model 160 to the position detection apparatus 100. The relearned learned model 160 is an example of a relearned model.

Figure 2:
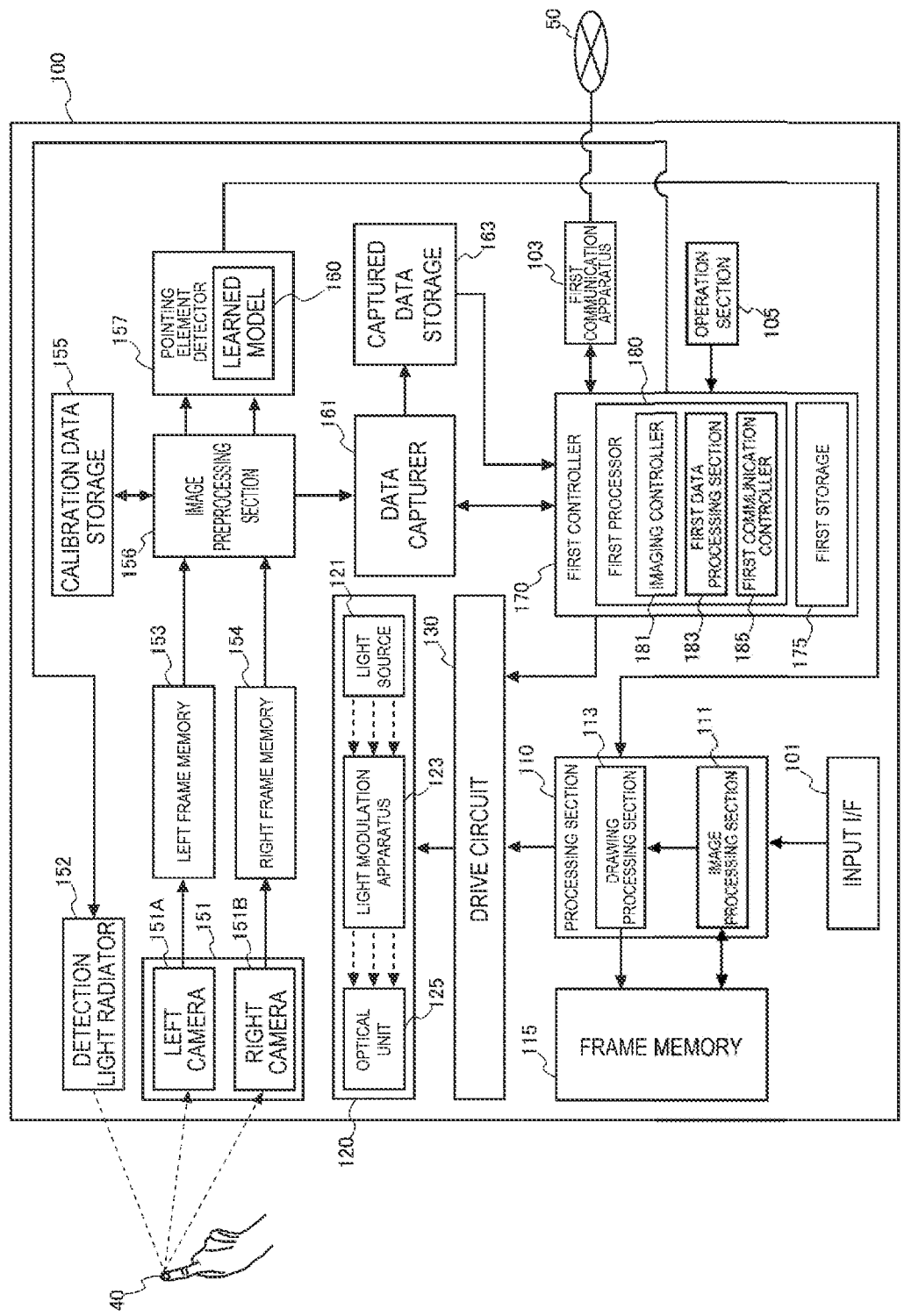
FIG. 2 is a block diagram showing the configuration of a position detection apparatus according to a first embodiment.

FIG. 2 is a block diagram showing the configuration of the position detection apparatus 100.

The position detection apparatus 100 includes an input interface 101, a first communication apparatus 103, an operation section 105, a processing section 110, a frame memory 115, the projection apparatus 120, a drive circuit 130, the left camera 151A, the right camera 151B, the detection light radiator 152, a left frame memory 153, a right frame memory 154, an image preprocessing section 156, a pointing element detector 157, a data capturer 161, a captured data storage 163, and a first controller 170. The input interface 101 is hereinafter abbreviated to an input I/F 101.

The input I/F 101 is an interface for connection with the external apparatus. The input I/F 101 includes a connector to which a cable is connected and an interface circuit that performs signal processing. An image signal is inputted to the input I/F 101 from the external apparatus connected via the cable. The Image signal contains a sync signal and image data. The input I/F 101 performs signal processing on the inputted image signal to extract the sync signal and the image data. The input I/F 101 outputs the extracted image data and sync signal to the processing section 110.

The first communication apparatus 103 is connected to the network 50, such as the Internet, via a router apparatus or the like that is not shown. The first communication apparatus 103 accesses the server apparatus 200 on the network 50 and transmits and receives data to and from the server apparatus 200. The present embodiment will be described with reference to a case where the position detection apparatus 100 includes the first communication apparatus 103 and is connected to the network 50 via a wire, but the position detection apparatus 100 may instead be configured to include a wireless communication apparatus that performs wireless communication in accordance with a predetermined wireless communication standard, such as Wi-Fi. Wi-Fi is a registered trademark.

The operation section 105 receives an infrared signal transmitted by a remote control that is not shown. The operation section 105 outputs an operation signal corresponding to the infrared signal received from the remote control to the first controller 170. The operation signal is a signal corresponding to an operated switch of the remote control.

The processing section 110 includes an image processing section 111 and a drawing processing section 113, and the image data is inputted from the input I/F 101 to the processing section 110. The image processing section 111 develops the inputted image data in the frame memory 115. The frame memory 115 includes a plurality of banks each having storage capacity that allows image data corresponding to one frame to be written in the bank. The frame memory 115 is formed of, for example, an SDRAM or a DDR. The SDRAM is an abbreviated notation of a synchronous dynamic random access memory. The DDR is an abbreviated notation of a double-data-rate synchronous dynamic random access memory.

The image processing section 111 performs image processing on the image data developed in the frame memory 115. The image processing performed by the image processing section 111 includes, for example, resolution conversion or resizing, distortion correction, shape correction, digital zooming, and adjustment of image hue and brightness. The image processing section 111 can, of course, perform a plurality of types of the image processing in combination.

The result of detection of the pointing element 40 is inputted from the pointing element detector 157, which will be described later, to the drawing processing portion 113. Specifically, the detection result inputted from the pointing element detector 157 to the drawing processing section 113 includes contact information representing whether or not the tip of the pointing element 40 has come into contact with the operation surface 15 and coordinate information representing the position of the tip of the pointing element 40 on the operation surface 15. The coordinate information represents coordinates in a coordinate system set in advance on the operation surface 15.

Further, the coordinates in the coordinate system set in advance on the operation surface 15 are associated with coordinates in a coordinate system set in the frame memory 115. The drawing processing section 113 converts the coordinates where the contact information indicates the contact on the operation surface 15 into coordinates in the frame memory 115. The drawing processing section 113 superimposes drawing data in the position in the frame memory 115 that corresponds to the converted coordinates. The processing section 110 outputs the data developed in the frame memory 115 to the drive circuit 130.

The processing section 110 and the frame memory 115 are, for example, formed of an integrated circuit. Part of the configuration of the integrated circuit may include an analog circuit.

The projection apparatus 120 is an apparatus that projects the image light 30 onto the projection surface 10 and includes a light source 121, a light modulation apparatus 123, and the optical unit 125.

The light source 121 is a lamp light source, such as a halogen lamp, a xenon lamp, and an ultrahigh-pressure mercury lamp. The light source 121 may instead be a solid-state light source, such as an LED or laser light source. The LED is an abbreviated notation of a light emitting diode.

The light modulation apparatus 123 includes a light modulator that modulates the light outputted by the light source 121 to generate the image light 30. The light modulator can, for example, be a transmissive liquid crystal light valve, a reflective liquid crystal light valve, or a digital mirror device.

The optical unit 125 includes a lens, a mirror, and other optical elements, enlarges the image light 30 generated by the light modulation apparatus 123, and projects the enlarged image light 30 onto the projection surface 10.

The drive circuit 130 is a circuit that drives the projection apparatus 120. The drive circuit 130 includes circuits that are separate from one another and drive the light source 121, the light modulation apparatus 123, and the optical unit 125, and one circuit that drives the light source 121, the light modulation apparatus 123, and the optical unit 125 is shown as the drive circuit 130 for simplicity. The drive circuit 130 turns on and off the light source 121 under the control of the first controller 170. The processing section 110 inputs data to the drive circuit 130. The drive circuit 130 generates signal voltage corresponding to the inputted data and applies the generated signal voltage to the light modulator provided in the light modulation apparatus 123. The amount of light that passes through the light modulator is thus controlled, so that the light from the light source 121 is modulated into the image light 30. Further, the drive circuit 130 drives motors that are not shown under the control of the first controller 170 to adjust the position of a projection lens provided in the optical unit 125 and the zooming performed by the optical unit 125.

The left camera 151A and the right camera 151B are each so set to be capable of capturing an image of the entire projection surface 10 and captures an image of the pointing element 40 with the projection surface 10 serving as a background. That is, the left camera 151A and the right camera 151B receive the light reflected off the projection surface 10 and the pointing element 40 out of the detection light 20 radiated from the detection light radiator 152 to create images each containing the pointing element 40. Using the two images captured by the left camera 151A and the right camera 151B allows the three-dimensional position of the pointing element 40 to be determined based, for example, on triangulation.

The left camera 151A and the right camera 151B each include, for example, a CCD or CMOS device, which is an imaging device that converts light focused by an optical system, such as a lens, into an electric signal. The CCD is an abbreviated notation of a charge coupled device. The CMOS is an abbreviated notation of s complementary metal oxide semiconductor. The left camera 151A and the right camera 151B are so arranged as to be capable of capturing the detection light 20 reflected off the pointing element 40. An infrared filter for receiving the reflected detection light 20 is attached to each of the left camera 151A and the right camera 151B.

The detection light radiator 152 includes an LD or an LED as a light source that outputs infrared light. The LD is an abbreviated notation of a laser diode. The detection light radiator 152 may include an optical part that diffuses the infrared light outputted by the light source toward the projection surface 10. The detection light irradiator 152 may be provided with a single light exiting port via which the detection light 20 exits, and the light exiting port may be disposed in a position between the left camera 151A and the right camera 151B. The detection light radiator 152 may instead be provided with two or more light exiting ports, and the light exiting ports may be disposed in positions corresponding to the left camera 151A and the right camera 151B. The contrast of the images captured by the left camera 151A and the right camera 151B can be improved, for example, by providing light exiting ports in positions adjacent to the left camera 151A and the right camera 151B and adjusting the light emission and image capturing timings.

The left camera 151A and the right camera 151B each capture an image of a range including the operation surface 15 at a predetermined frame rate. When the user causes the pointing element 40 to approach the projection surface 10, the imaging apparatus 151 capture images of the detection light 20 radiated by the detection light radiator 152 and reflected off the pointing element 40. The image captured by the left camera 151A is stored in the left frame memory 153, and the image captured by the right camera 151B is stored in the right frame memory 154. The image captured by the left camera 151A is called a left captured image, and the image captured by the right camera 151B is called a right captured image. The left frame memory 153 and the right frame memory 154 each include a plurality of banks each having storage capacity that allows a captured image corresponding to one frame to be written in the bank. The left frame memory 153 and the right frame memory 154 are each formed, for example, of an SDRAM or a DDR.

A calibration data storage 155 stores first range information, second range information, and calibration data. The first range information is information representing the range of a projection region in the left captured image captured by the left camera 151A. The second range information is information representing the range of the projection region in the right captured image captured by the right camera 151B. The projection region is a region of the projection surface 10 that is the region where the position detection apparatus 100 projects the image light 30. The first range information and the second range information are produced, for example, as follows: The position detection apparatus 100 projects a pattern image having a pattern set in advance on the projection surface 10; the left camera 151A and the right camera 151B capture images of the projection surface 10; the first range information is generated by detecting the range containing the captured pattern image from the left captured image captured by the left camera 151A, and the second range information is generated by detecting the range containing the captured pattern image from the right captured image captured by the right camera 151B.

The calibration data is data generated when the position detection apparatus 100 is installed or activated and includes a first image deformation coefficient and a second image deformation coefficient. The first image deformation coefficient is a coefficient that causes the shape of an image cut off the left captured image in accordance with the first range information to be deformed into a rectangular shape. The second image deformation coefficient is a coefficient that causes the shape of an image cut off the right captured image in accordance with the second range information to be deformed into a rectangular shape.

The image preprocessing section 156 reads the left captured image from the left frame memory 153 and reads the right captured image from the right frame memory 154. The image preprocessing section 156 further reads the first range information, the second range information, and the calibration data from the calibration data storage 155.

The image preprocessing section 156 uses the first range information to cut an image of the range where an image of the projection region has been captured off the left captured image. The image preprocessing section 156 deforms the cutout image into a rectangle by using the first image deformation coefficient. The image deformed into a rectangle is called a left rectangular image. The image preprocessing section 156 further uses the second range information to cut an image of the range where an image of the projection region has been captured off the right captured image. The image preprocessing section 156 deforms the cutout image into a rectangle by using the second image deformation coefficient. The image deformed into a rectangle is called a right rectangular image.

The image preprocessing section 156 then generates a difference image based on the left rectangular image and the right rectangular image. In the present embodiment, the image preprocessing section 156 generates the difference image by subtracting the right rectangular image from the left rectangular image and may instead generate the difference image by subtracting the left rectangular image from the right rectangular image.

The image preprocessing section 156 outputs the left rectangular image and the right rectangular image, which are the results of the deformation, and the generated difference image to the pointing element detector 157.

The left rectangular image, the right rectangular image, and the difference image are inputted to the pointing element detector 157. The left rectangular image and the right rectangular image or the difference image may instead be inputted to the pointing element detector 157.

The pointing element detector 157 includes a storage that stores the learned model 160. The learned model 160 is formed of the combination of a predetermined model structure and optimized processing parameters. The pointing element detector 157 is formed of software that forms the learned model 160 and hardware that executes the software. The pointing element detector 157 in the present embodiment will be described with reference to a case where the learned model 160 is a convolutional neural network, but the learned model 160 may instead be a neural network other than a convolutional neural network.

The pointing element detector 157 inputs the inputted left rectangular image and right rectangular image or difference image to the learned model 160 and outputs the contact information representing whether or not the tip of the pointing element 40 has come into contact with the operation surface 15 and the coordinate information representing the position of the tip of the pointing element 40 on the operation surface 15. When an image is drawn on the projection surface 10 in response to the pointing operation performed by the pointing element 40, the contact information and the coordinate information outputted by the pointing element detector 157 are inputted to the drawing processing section 113 of the processing section 110.

The data capturer 161 causes the captured data storage 163 to store the images inputted to the image preprocessing section 156. The images that the data capturer 161 causes the captured data storage 163 to store may be the left captured image read from the left frame memory 153 and the right captured image read from the right frame memory 154. The captured images that the data capturer 161 causes the captured data storage 163 to store may be the left rectangular image and the right rectangular image, which are the images deformed into rectangles by the preprocessing section 156. The data capturer 161 may instead cause the captured data storage 163 to store the difference image in addition to the left rectangular image and the right rectangular image. The present embodiment will be described with reference to the case where the data capturer 161 causes the captured data storage 163 to store the left captured image and the right captured image.

The first controller 170 is a computer apparatus including a first storage 175 and a first processor 180. The first storage 175 includes a volatile storage device, such as a RAM, and a nonvolatile storage device, such as a ROM and a flash memory. The first storage 175 stores a control program executed by the first processor 180 and identification information that identifies the position detection apparatus 100. The identification information may be set by the user of the position detection apparatus 100 or by the server apparatus 200 when the position detection apparatus 100 is registered in the server device 200. The control program includes, for example, firmware. The RAM is an abbreviated notation of a random access memory, and the ROM is an abbreviated rotation of a read only memory.

The first processor 180 is an arithmetic operation apparatus formed of a CPU or MPU. The first processor 180 executes a first control program to control each portion of the position detection apparatus 100. The first processor 180 may be formed of a single processor or a plurality of processors. The first processor 180 may be formed of an SoC integrated with part or entirety of the first storage 175 and other circuits. The first processor 180 may instead be formed of the combination of a CPU that executes a program and a DSP that performs predetermined arithmetic operation. Further, the entire functions of the first processor 180 may be implemented in hardware or may be implemented by using a programmable device. The CPU is an abbreviated notation of a central processing unit, and the MPU is an abbreviated notation of a micro processing unit.

The first controller 170 includes an imaging controller 181, a first data processing section 183, and a first communication controller 185 each in the form of a software module.

The imaging controller 181 causes the detection light radiator 152 to radiate the detection light and causes the left camera 151A and the right camera 151B to perform imaging. The left camera 151A and the right camera 151B capture the range including the projection surface 10 at a frame rate set in advance to generate the left captured image and the right captured image.

The first data processing section 183 reads the left captured image and the right captured image stored in the captured data storage 163. The first data processing section 183 compresses the read left captured image and right captured image and encrypts the compressed left captured image and right captured image based on an encryption method set in advance. The first data processing section 183 is an example of an image compressor.

The first data processing section 183 further reads the data stored in the first storage 175, decrypts the read data, and decompresses the decrypted data. The data read from the first storage 175 by the first data processing section 183 is data received from the server apparatus 200 under the control of the first communication controller 185, specifically, is the learned model 160.

The first communication controller 185 controls the data communication with the server apparatus 200. The first communication controller 185 adds the identification information that identifies the position detection apparatus 100 to the left captured image and the right captured image encrypted by the first data processing section 183 and transmits the resultant images to the server apparatus 200. Further, the first communication controller 185 controls the first communication apparatus 103 to receive data on the learned model 160 transmitted from the server apparatus 200 and causes the first storage 175 to store the received data. The first communication controller 185 and the first communication apparatus 103 are an example of a first transmitter.

FIG. 2 does not show signal lines that connect the imaging apparatus 151, the image preprocessing section 156, and the pointing element detector 157 to the first controller 170, but it is noted that the first controller 170 is coupled to the imaging apparatus 151, the image preprocessing section 156, and the pointing element detector 157 via control lines and controls the operation of each of the portions described above.

The configuration of the server apparatus 200 will next be described with reference to FIG. 3.

The server apparatus 200 includes a second communication apparatus 210, a second storage 220, and a second controller 230.

The second communication apparatus 210 is connected to the network 50 and performs data communication with an instrument connected to the network 50.

The second storage 220 is an auxiliary storage device, and is formed, for example, of a magnetic hard disk device, a semiconductor storage device, or any other storage device. The second storage 220 stores learning data 221 and the learned model 160 in association with the identification information that identifies the position detection apparatus 100. The learning data 221 is the left captured image and the right captured image received from the position detection apparatus 100.

The second controller 230 includes a memory 240 and a second processor 250.

The memory 240 includes a ROM and RAM. The memory 240 may be configured to include a nonvolatile memory, such as a flash memory, in addition to the ROM and the RAM.

The memory 240 stores a second control program 241 executed by the second processor 250, a learning program 243, and a variety of data processed by the second processor 250 in a non-volatile manner. The learning program 243 is a program that causes the second processor 250 to execute a learning algorithm, such as deep learning.

The second processor 250 is an arithmetic operation apparatus formed of a CPU or an MPU. The second processor 250 executes the second control program 241 to control each portion of the server apparatus 200. The second processor 250 may be formed of a single processor or a plurality of processors. The second processor 250 may instead be formed of the combination of a CPU that executes the second control program 241 and a DSP that performs predetermined arithmetic operation or may be formed of an FPGA.

The second controller 230 includes a second communication controller 251, an image detector 253, a learner 255, a size reduction processing section 257, and a second data processing section 259 each in the form of a software module.

The second communication controller 251 controls the second communication apparatus 210 to perform data communication with the position detection apparatus 100 connected to the network 50. The second communication controller 251 causes the second storage 220 to store data received from the position detection apparatus 100. Further, the second communication controller 251 transmits data compressed, encrypted, or otherwise processed by the second data processing section 259 to the position detection apparatus 100. The second communication controller 251 and the second communication apparatus 210 are an example of a second transmitter.

The image detector 253 reads the data stored in the second storage 220. The read data is the data received from the position detection apparatus 100 by the server apparatus 200 and includes the identification information that identifies the position detection apparatus 100 and the compressed and encrypted data. The image detector 253 decrypts the read data and decompresses the decrypted data. The decrypted and decompressed data includes the left captured image and the right captured image.

The image detector 253 cuts out a predetermined range of each of the left captured image and right captured image, which are the result of the decryption and decompression. The range cut off each of the left captured image and the right captured image may be a range set in advance or may be set based on the first range information and the second range information notified from the position detection apparatus 100. The first range information is information representing the range of the projection region in the left captured image captured by the left camera 151A, and the second range information is information representing the range of the projection region in the right captured image captured by the right camera 151B. The position detection apparatus 100 transmits the first range information and the second range information to the server apparatus 200 in advance. The server apparatus 200 causes the second storage 220 to store the first range information and the second range information, which have been received from the position detection apparatus 100, in association with the identification information that identifies the position detection apparatus 100. The image cut off the left captured image by the image detector 253 is called a left cutout image, and the image cut off the right captured image by the image detector 253 is called a right cutout image. The position detection apparatus 100 may instead generate the left cutout image and the right cutout image and transmit the generated images as the left captured image and the right captured image to the server apparatus 200.

Figure 4:
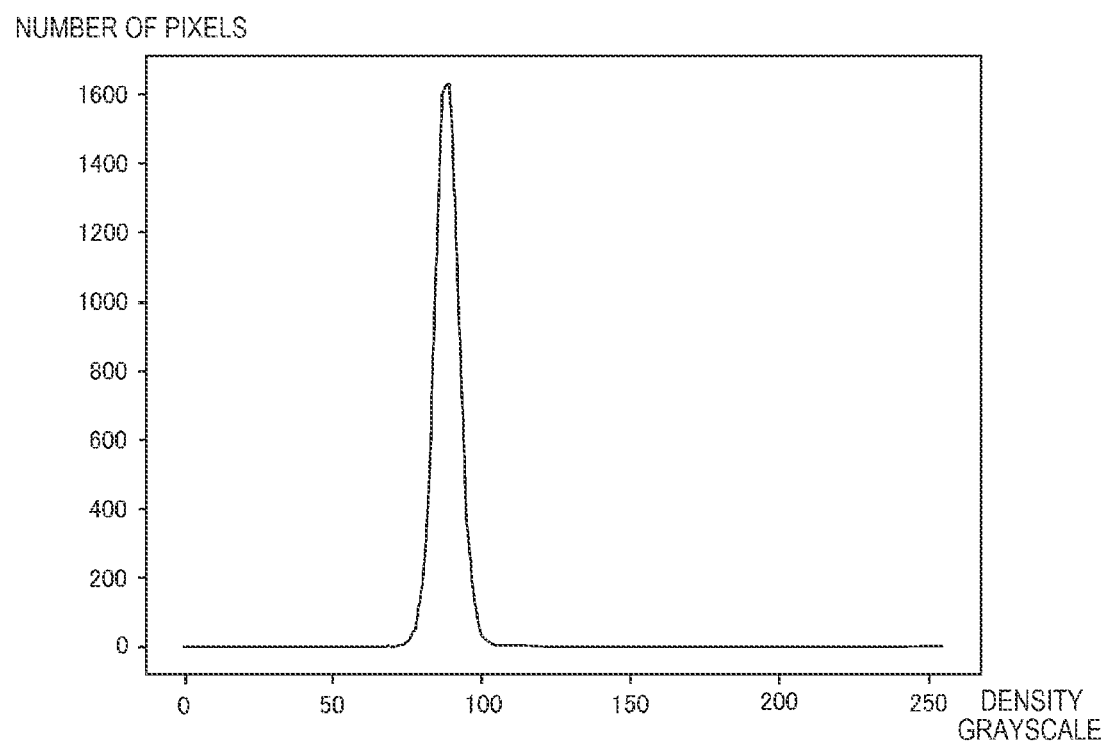
FIG. 4 shows a histogram generated based on captured images.
Figure 5:
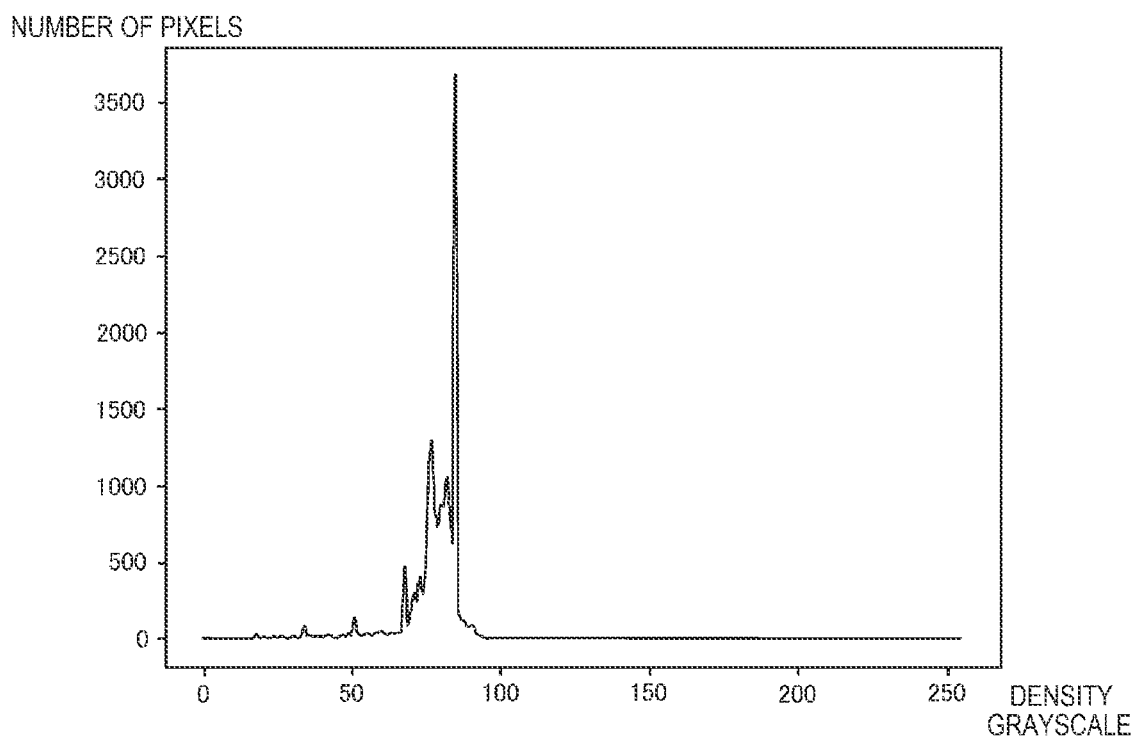
FIG. 5 shows another histogram generated based on the captured images.

Having cut out the left cutout image off the left captured image and the right cutout image off the right captured image, the image detector 253 creates a density grayscale histogram based on the left cutout image and the right cutout image, which are the result of the cutting-out operation. FIGS. 4 and 5 show examples of the histogram created by the image detector 253. The horizontal axis of the histogram shown in FIGS. 4 and 5 represents the density grayscale, and the vertical axis of the histogram represents the number of pixels. FIG. 4 shows a histogram when the left cutout image or the right cutout image does not contain the user's finger, which is the pointing element 40, and FIG. 5 shows a histogram when the left cutout image and the right cutout image contains the user's finger, which is the pointing element 40.

Having created the histogram, the image detector 253 labels the left cutout image and the right cutout image based on the created histogram.

The image detector 253 first counts the number of peaks contained in the created histogram. The number of peaks is the number of local maximums indicated by the number of pixels along the vertical axis of the histogram. When the number of peaks contained in the histogram is smaller than or equal to two, the image detector 253 determines that the left cutout image or the right cutout image based on which the histogram has been created is an image containing only the captured projection surface 10, which is the background. The image detector 253 labels the left cutout image or the right cutout image determined to be an image containing only the captured projection surface 10 as a first image. The first image means a background image containing only the captured projection surface 10.

When the number of peaks contained in the histogram is greater than three, the image detector 253 determines that the left cutout image or the right cutout image based on which the histogram has been created is an image containing not only the captured projection surface 10, which is the background, but another captured object. Examples of the object other than the projection surface 10 may include the pointing element 40, the user, a letter, a symbol, a figure, an image, and the like displayed on the projection surface 10. The image detector 253 labels the left cutout image or the right cutout image determined to be an image containing a captured object other than the projection surface 10 as a second image. The second image means an image containing a captured object other than the projection surface 10. The image detector 253 causes the second storage 220 to store the left cutout image or the right cutout image labeled with the first image or the second image in association with the identification information that identifies the position detection apparatus 100.

The learner 255 relearns the learned model 160.

The learner 255 first evaluates whether or not the number of left cutout images or right cutout images labeled with the first image by the image detector 253 is greater than or equal to a value set in advance. The learner 255 requests the position detection apparatus 100 to resend the data when the number of left cutout images or right cutout images labeled with the first image is smaller than the set value. When the number of left cutout images or right cutout images labeled with the first image is greater than the set value, the learner 255 reads from the second storage 220 the learned model 160 and the learning data 221 associated with the same identification information as the identification information received from the position detection apparatus 100. The learning data 221 corresponds to a left captured image and a right captured image received in the past from the position detection apparatus 100.

The learner 255 relearns the learned model 160 by using the learning data 221 read from the second storage 220 and the left cutout images and the right cutout images labeled with the first image as a learning data set. For example, the learner 255 executes a deep learning algorithm in accordance with the learning program 243 to relearn the convolutional neural network. The learner 255 causes the second storage 220 to store the relearned learned model 160 in association with the identification information that identifies the position detection apparatus 100.

The size reduction processing section 257 reduces the size of the learned model 160 relearned by the learner 255 based on pruning or quantization. In a neural network containing a convolutional neural network, a node value is transmitted from an upper layer to a lower layer. During the transmission, weighting using a weight parameter set for each inter-node connection is performed. The size reduction processing section 257 reduces the size of the neural network by deleting a node having a weight parameter value smaller than a value set in advance. The relearned learned model 160 having been reduced in size is an example of a reduced-size model.

The size reduction processing section 257 further reduces the size of the convolutional neural network, for example, by expressing the value of the node weight parameter with a 16-bit floating point or INT8 in the form of a 1-byte integer format. The value of the node weight parameter may instead be expressed in 4 bits, 2 bits, or 1 bit.

The second data processing section 259 compresses the learned model 160 reduced in size by the size reduction processing section 257 and encrypts the compressed learned model 160. The second data processing section 259 causes the second storage 220 to store the compressed, encrypted learned model 160 in association with the identification information that identifies the position detection apparatus 100. The learned model 160 compressed and encrypted by the second data processing section 259 is transmitted to the position detection apparatus 100 under the control of the second communication controller 251. The second data processing section 259 is an example of a model compressor, and the compressed, encrypted learned model 160 is an example of a compressed model.

Figure 6:
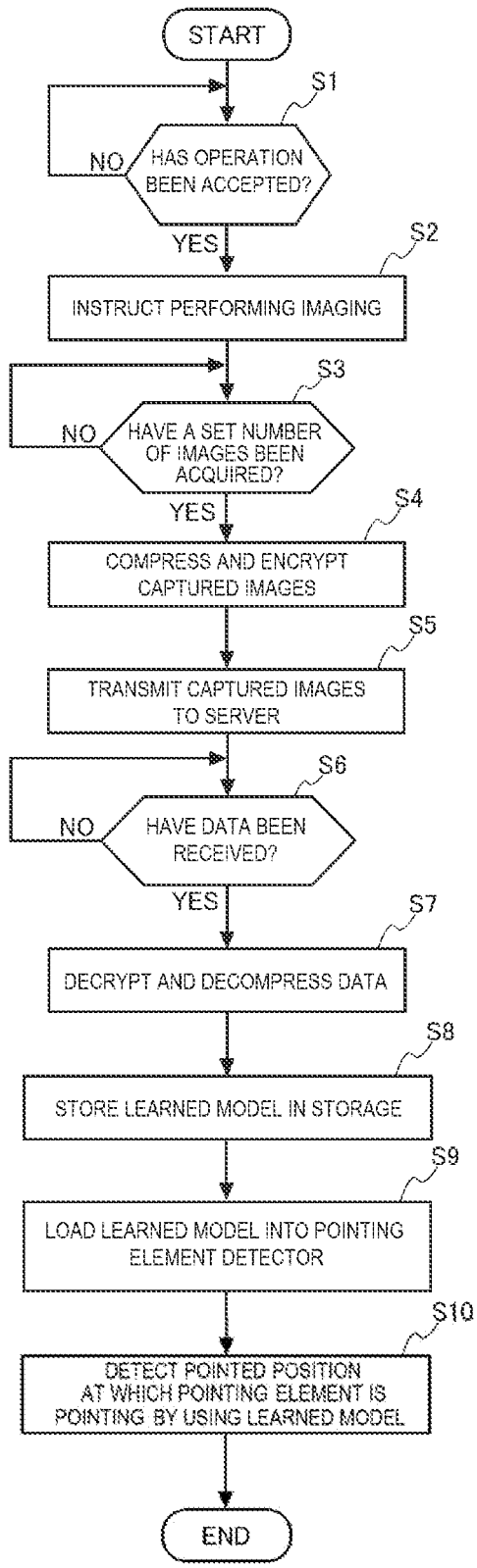
FIG. 6 is a flowchart showing the operation of the position detection apparatus.

FIG. 6 is a flowchart showing the operation of the position detection apparatus 100. The operation of the position detection apparatus 100 will be described with reference to the flowchart shown in FIG. 6.

First, the first controller 170 evaluates whether or not the operation section 105 has accepted predetermined operation (step S1). For example, when the location where the position detection apparatus 100 has been installed is changed or when the accuracy of detection of the pointing element 40 is desired to be improved, the operator operates a predetermined button provided on the remote control.

When the operation section 105 has accepted no operation (NO in step S1), the first controller 170 waits until operation is accepted. When an operation signal corresponding to operation performed on a predetermined button provided on the remote control is inputted from the operation section 105, the first controller 170 displays guidance set in advance on the projection surface 10. The displayed guidance includes guidance stating that an image of the projection surface 10 is captured by the imaging apparatus 151 and guidance prompting the operator not to enter the region corresponding to the angle of view of the imaging apparatus 151.

The first controller 170 stops displaying the guidance after a predetermined period has elapsed since the guidance was displayed and instructs the imaging apparatus 151 to perform imaging (step S2). Step S2 is an example of an imaging step. The left captured image captured by the left camera 151A is stored in the left frame memory 153, and the right captured image captured by the right camera 151B is stored in the right frame memory 154. The image preprocessing section 156 reads the left captured image captured by the left camera 151A from the left frame memory 153 and reads the right captured image captured by the right camera 151B from the right frame memory 154. The data capturer 161 causes the captured data storage 163 to store the captured images captured by the left camera 151A and the right camera 151B and read by the image preprocessing section 156.

The data capturer 161 evaluates whether or not the number of left and right captured images stored in the captured data storage 163 has been greater than or equal to a number set in advance (step S3). When the number of left and right captured images stored in the captured data storage 163 is smaller than the set number (NO in step S3), the data capturer 161 waits until the number of left and right captured images stored in the captured data storage 163 is greater than or equal to the set number.

When the data capturer 161 determines that the number of left and right captured images stored in the captured data storage 163 is greater than or equal to the set number (YES in step S3), the data capturer 161 outputs a notification signal to the first controller 170. When the notification signal is inputted from the data capturer 161 to the first controller 170, the first controller 170 reads the left and right captured images stored in the captured data storage 163. The first controller 170 compresses the read left and right captured images and encrypts the compressed left and right captured images (step S4). The first controller 170 controls the first communication apparatus 103 to transmit the compressed, encrypted left and right captured images to the server apparatus 200 (step S5).

The first controller 170 then evaluates whether or not data have been received from the server apparatus 200 (step S6). When the first controller 170 has not received data from the server apparatus 200 (NO in step S6), the first controller 170 carries out another process and waits until data are received from the server apparatus 200. When the first controller 170 has received data from the server apparatus 200 (YES in step S6), the first controller 170 decrypts the received data and decompresses the decrypted data to acquire the learned model 160 (step S7).

The first controller 170 then causes the first storage 175 to store the acquired learned model 160 (step S8). Having caused the first storage 175 to store the learned model 160, the first controller 170 reads the stored learned model 160 and loads the read learned model 160 into the pointing element detector 157 (step S9). The pointing element detector 157 develops the loaded learned model 160 in the storage. Thereafter, when the left rectangular image and the right rectangular image or the difference image is inputted from the image preprocessing section 156 to the pointing element detector 157, the pointing element detector 157 inputs the images to the learned model and outputs the contact information and the coordinate information (step S10). Step S10 corresponds to the pointing element detection step in the present disclosure.

The operation of the server apparatus 200 will next be described with reference to the flowchart shown in FIG. 7.

The second controller 230 evaluates whether or not data have been received from the position detection apparatus 100 (step S1). When the second controller 230 has not received data (NO in step S1), the second controller 230 waits to start a process until data is received. When the second controller 230 receives data from the position detection apparatus 100 (YES in step T1), the second controller 230 decrypts the received data and decompresses the decrypted data to acquire the left captured image and the right captured image (step T2).

The second controller 230 causes the second storage 220 to store the acquired left and right captured images (step T3). The second controller 230 then reads the left and right captured images from the second storage 220 and develops the read left and right captured images in the memory 240. The second controller 230 cuts the developed left and right captured images into portions each having a size set in advance (step T4). For example, the second controller 230 cuts out a pre-set range of the left captured image to generate a left cutout image and cuts out a pre-set range of the right captured image to generate a right cutout image. The second controller 230 may instead generate a left cutout image from the left captured image and a right cutout image from the right captured image based on the first range information and the second range information notified from the position detection apparatus 100.

Thereafter, having generated the left cut image and the right cut image, the second controller 230 creates a luminance histogram based on the generated left and right cutout images (step T5). The second controller 230 counts the number of peaks contained in the created histogram and evaluates whether or not the number of counted peaks satisfies a setting condition (step T6). When the number of peaks contained in the histogram is one or two, the second controller 230 determines that the setting condition is satisfied (YES in step T6) and labels the left cutout image or the right cutout image as the first image (step T7). When the number of peaks contained in the histogram is greater than two, the second controller 230 determines that the setting condition is not satisfied (NO in step T6) and labels the left cutout image or the right cutout image as the second image (step T8). Steps T6, T7 and T8 correspond to the image detection step in the present disclosure.

The second controller 230 then evaluates whether or not all the left and right captured images stored in the second storage 220 have been selected as the targets to be processed (step T9). When the second controller 230 has not selected all the left and right captured images as the targets to be processed (NO in step T9), the second controller 230 reads the left captured image or the right captured image from the second storage 220 and carries out the processes in step T4 and the following steps on the read left or right captured image.

When the second controller 230 has selected all the left and right captured images as the targets to be processed (YES in step T9), the second controller 230 generates a learning data set (step T10). The learning data set includes the left cutout image and the right cutout image labeled as the first image in step T7 and images corresponding to left and right captured images used in the past to generate the learned model 160.

The second controller 230 then reads the learned model 160 stored in the second storage 220 (step T11). The learned model 160 read in step T11 is a learned model 160 that has not undergone the size reduction based, for example, on pruning or bit reduction. Having read the learned model 160, the second controller 230 relearns the read learned model 160 by using the learning data set generated in step T10 (step T12). Step T12 corresponds to the relearning step in the present disclosure.

The second controller 230 then reduces the size of the learned model 160 having undergone the relearning in step T12 based on pruning and bit reduction (step T13). Having reduced the size of the learned model 160 based on pruning and bit reduction, the second controller 230 causes the second storage 220 to store the learned model 160 before the size reduction and the learned model 160 after the size reduction in association with the identification information that identifies the relevant position detection apparatus 100 (step T14).

The second controller 230 then compresses the learned model 160 reduced in size and encrypts the compressed learned model 160 (step T15). The second controller 230 transmits the compressed, encrypted learned model 160 to the relevant position detection apparatus 100 (step T16).

As described above, the position detection system 1 according to the first embodiment includes the position detection apparatus 100 and the server apparatus 200.

The position detection apparatus 100 includes the imaging apparatus 151, the pointing element detector 157, and the first communication controller 185.

The imaging apparatus 151 includes the left camera 151A and the right camera 151B and captures an image of a range including at least part of the operation surface 15 to generate captured images.

The pointing element detector 157 detects the pointed position at which the pointing element 40 is pointing on the operation surface 15 from the captured images by using the learned model 160.

The first communication controller 185 transmits the captured images to the server apparatus 200.

The server apparatus 200 includes the image detector 253, the learner 255, and the second communication controller 251.

The image detector 253 detects a captured image containing no image of the pointing element 40 out of the captured images received from the position detection apparatus 100.

The learner 255 generates learning data containing the captured image detected by the image detector 253 and relearns the learned model 160 by using the generated learning data.

The second communication controller 251 transmits the learned model 160 relearned by the learner 255 to the position detection apparatus 100.

The pointing element detector 157 detects the pointed position on the operation surface 15 from the captured image by using the relearned learned model 160.

Therefore, since the learned model 160 is relearned by using the learning data containing a captured image containing no image of the pointing element 40, false operation detection that occurs when no operation is performed can be reduced, whereby the configuration in the first embodiment prevents an incorrect process from being carried out.

The image detector 253 creates a histogram of the captured images and detects a captured image containing no image of the pointing element 40 based on the number of local maximums contained in the created histogram.

The accuracy of detection of a captured image containing no image of the pointing element 40 can therefore be increased.

The learner 255 uses the captured image containing no image of the pointing element 40 and detected by the image detector 253 and previous learning data used to generate a learned model through learning as new learning data to relearn the learned model.

False operation detection that occurs when no operation is performed can therefore be reduced, whereby the configuration described above prevents an incorrect process from being carried out.

The server apparatus 200 includes the size reduction processing section 257, which reduces the size of the relearned learned model 160 based on at least one of pruning and quantization.

Therefore, when the pointing element detector 157 detects a position at which the pointing element 40 is pointing, the amount of calculation can be reduced, whereby the processing period can be shortened.

The server apparatus 200 includes the second data processing section 259, which compresses the learned model 160 reduced in size by the size reduction processing section 257. The second communication controller 251 transmits the learned model 160 compressed by the second data processing section 259 to the position detection apparatus 100.

The amount of data to be transmitted from the server apparatus 200 to the position detection apparatus 100 can therefore be reduced.

The position detection apparatus 100 includes the first data processing section 183, which compresses a captured image.

The first controller 170 transmits the captured image compressed by the first data processing section 183 to the server apparatus 200.

The amount of data to be transmitted from the position detection apparatus 100 to the server apparatus 200 can therefore be reduced.

Second Embodiment

A second embodiment of the present disclosure will next be described with reference to the accompanying drawings.

In the first embodiment, the position detection system 1 including the position detection apparatus 100 and the server apparatus 200 has been described. In the second embodiment, the first controller 170 of the position detection apparatus 100 generates the learned model 160 and relearns the generated learned model 160.

Figure 8:
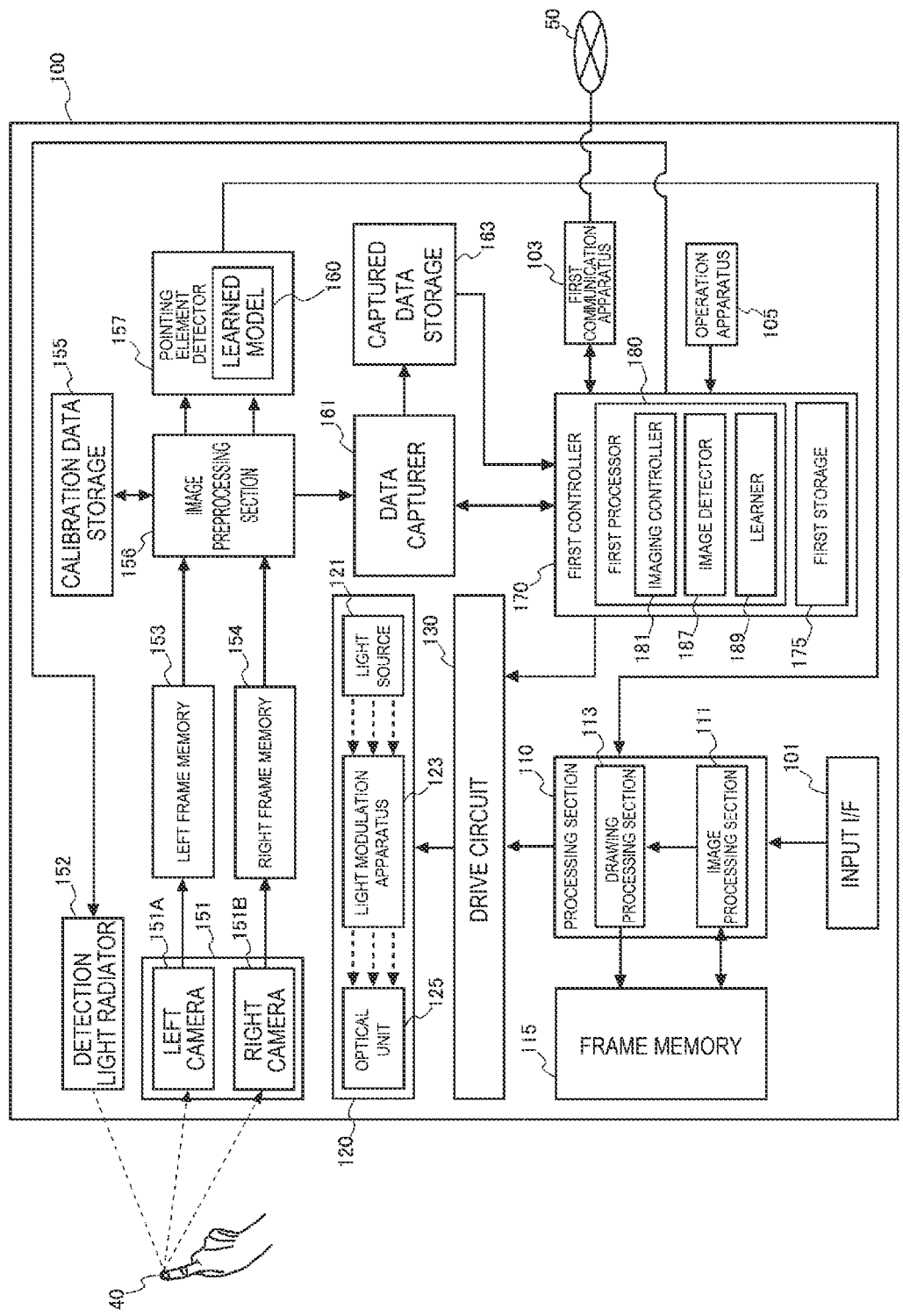
FIG. 8 is a block diagram showing the configuration of the position detection apparatus according to a second embodiment.

FIG. 8 is a block diagram showing the configuration of the position detection apparatus 100 according to the second embodiment. The first controller 170 of the position detection apparatus 100 includes an image detector 187 and a learner 189 each in the form of a software module in addition to the imaging controller 181.

The first storage 175 in the second embodiment stores the first range information, the second range information, the learned model 160, and the learning data 221.

The image detector 187 reads the left captured image and the right captured image stored in the captured data storage 163. The image detector 187 cuts out a pre-set range of the left captured image to generate a left cutout image and cuts out a pre-set range of the right captured image to generate a right cutout image. The image detector 187 may instead cut out a left cutout image that is an image of the range where the projection region has been captured off the left captured image in accordance with the first range information and cut a right cutout image that is an image of the range where the projection region has been captured off the right captured image in accordance with the second range information. The image detector 187 creates histograms of the left cutout image and right cutout image, which are the results of the cutting out operation, and labels the left cutout image and the right cutout image as the first or second image based on the created histograms.

The learner 189 reads the learning data 221 stored in the first storage 175. Further, the learner 189 relearns the learned model 160 by using the read learning data 221, the left cutout image and the right cutout image labeled as the first image as the learning data set. The learner 189 executes a deep learning algorithm to relearn the convolutional neural network. The learner 255 causes the first storage 175 to store the relearned learned model 160 and outputs the relearned learned model 160 to the pointing element detector 157. The pointing element detector 157 detects the pointed position at which the pointing element 40 is pointing on the projection surface 10 by using the learned model 160 relearned by the learner 189.

As described above, the position detection apparatus 100 according to the second embodiment also relearns the learned model 160 by using learning data containing a captured image containing no image of the pointing element 40. False operation detection that occurs when no operation is performed can therefore be reduced, whereby the configuration described above prevents an incorrect process from being carried out.

The embodiments described above are preferable embodiments of the present disclosure. The present disclosure is, however, not limited to the embodiments described above, and a variety of variations can be conceivable to the extent that the variations do not depart from the substance of the present disclosure.

For example, the aforementioned embodiments have been described with reference to the configuration in which the position detection apparatus 100 includes the imaging apparatus 151, and the imaging apparatus 151 may instead be provided separately from the position detection apparatus 100. Further, the aforementioned embodiments have been described with reference to the configuration in which the position detection device 100 includes the detection light radiator 152, and the detection light radiator 152 may be provided separately from the position detection apparatus 100. For example, the imaging apparatus 151 may be configured as an imaging apparatus that operates independently, and the imaging apparatus and the position detection apparatus 100 may be coupled to each other in a wired or wireless manner. Further, the detection light radiator 152 may be configured as a detection light radiator that operates independently, and the detection light radiator and the position detection apparatus 100 may be coupled to each other in a wired or wireless manner. The aforementioned embodiments have been described with reference to the configuration in which the position detection apparatus 100 includes a projector, and the functional portions of the projector, such as the projection apparatus 120, may be portions separate from the position detection apparatus 100.

Figure 3:
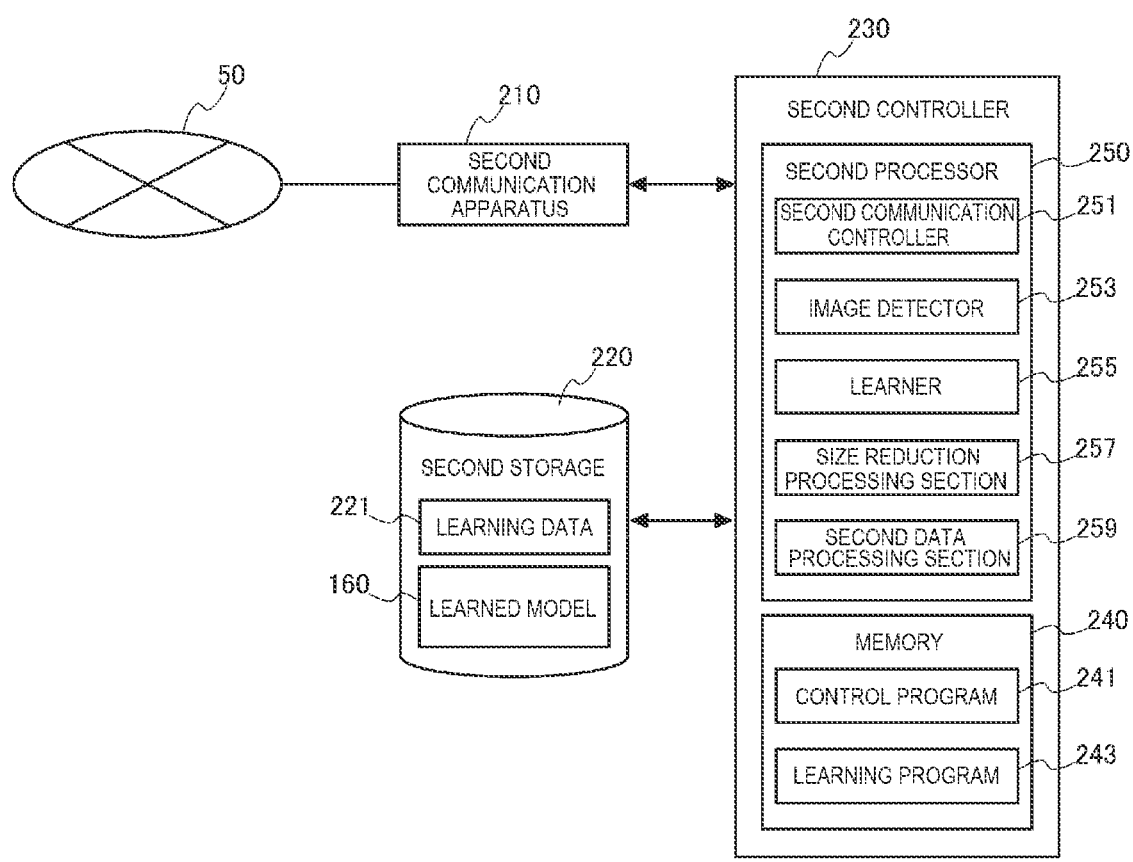
FIG. 3 is a block diagram showing the configuration of a server apparatus.

The functional portions of the position detection apparatus 100 shown in FIG. 2 and the functional portions of the server apparatus 200 shown in FIG. 3 each represent a functional configuration and are not each necessarily implemented in a specific form. That is, hardware corresponding to each of the functional portions is not necessarily implemented, and a single processor that executes a program can, of course, achieve the functions of the plurality of functional portions. Further, in the embodiments described above, part of the functions achieved by software may be achieved by hardware, or part of the functions achieved by hardware may be achieved by software. In addition, the specific detailed configuration of each of the other portions in the position detection apparatus can be arbitrarily changed to the extent that the change does not depart from the substance of the present disclosure.

Figure 7:
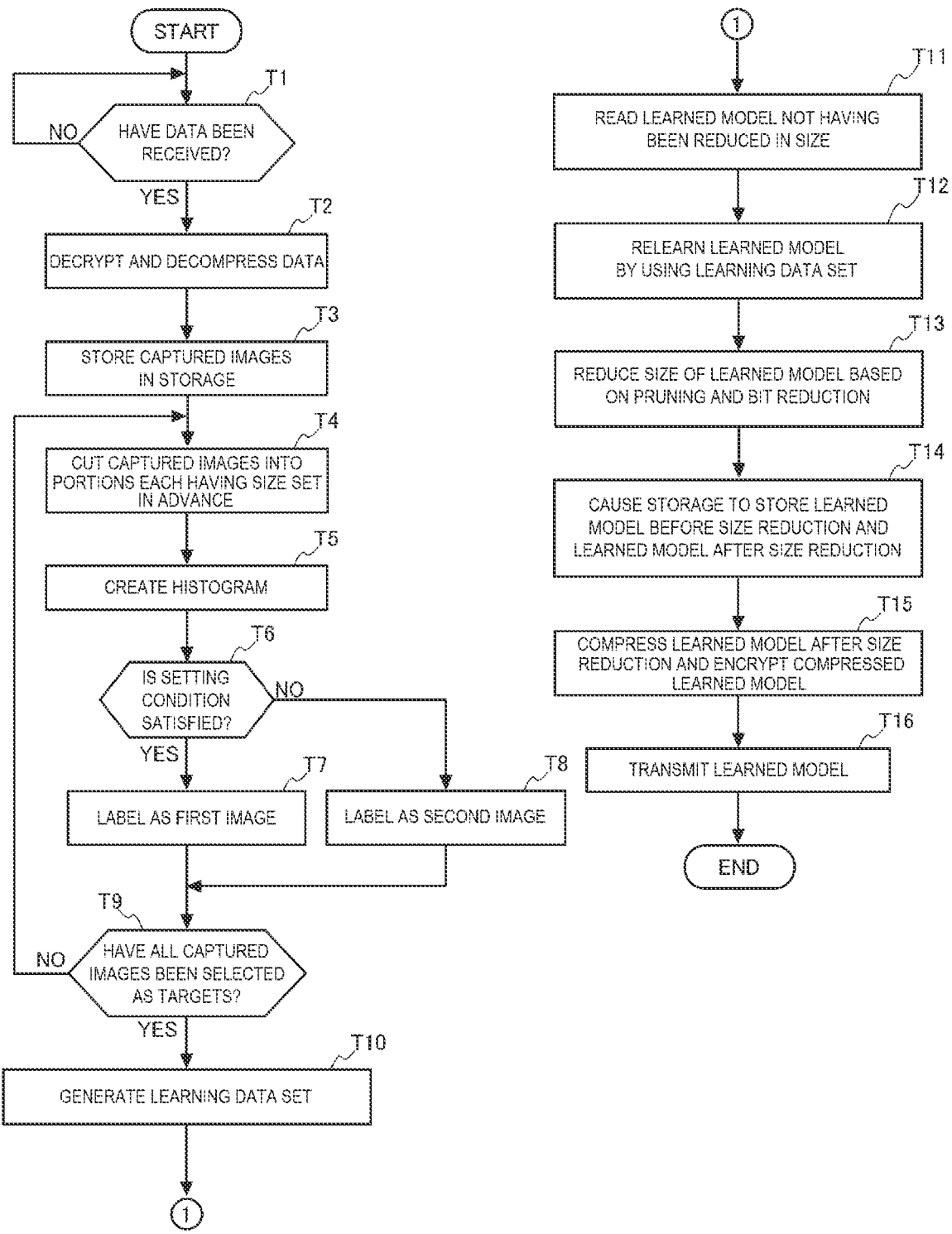
FIG. 7 is a flowchart showing the operation of the server apparatus.

The process units in the flowchart shown in FIG. 6 are process units divided in accordance with primary processing contents for easy understanding of the processes carried out by the position detection apparatus 100, and the process units in the flowchart shown in FIG. 7 are also process units divided in accordance with primary process contents. How to produce the divided process units or the names of the process units shown in FIGS. 6 and 7 do not limit the present disclosure. A process carried out by the position detection apparatus 100 or the server apparatus 200 can be further divided into a larger number of process units in accordance with the content of the process, and each of the process units can further be divided into a large number of processes.

Further, the orders in accordance with which the processes are carried out in the flowcharts described above are not limited to those shown in FIGS. 6 and 7.

In a case where the position detection method is achieved by a computer incorporated in the position detection apparatus 100, a program executed by the computer can be configured in the form of a recording medium or a transmission medium that transmits the program. The recording medium can be a magnetic or optical recording medium or a semiconductor memory device. Specific examples of the recording medium may include a flexible disk, an HDD, a CD-ROM, a DVD, a Blu-ray Disc, a magneto-optical disk, a flash memory, and a portable or immobile recording medium, such as a card-shaped recording medium. The recording medium described above may instead be a RAM, a ROM, an HDD, or any other nonvolatile storage device that is an internal storage device provided in the server apparatus. Blu-ray is a registered trademark.

What is claimed is:

1. A position detection system comprising:
a position detection device apparatus includes an image capture device that captures images of a range including an operation surface,a processor configured to detect a pointed position at which a pointing element is pointing on the operation surface by using a learned model based on captured images captured by the imaging
a server apparatus including at least one processor configured to receive the captured images from the image capture device:
detect a first image that does not contain an image of the pointing element out of the captured images,
generate learning data containing the first relearn the learned model using the learning data to obtain a relearned model;
transmit the relearned model to the position detection device, wherein the position detection device detects the pointed position using the relearned model.

2. The position detection system according to claim 1, wherein the at least one processor of the server is further configured to create a histogram of luminance values of each of the captured images, and
detects the first image based on the number of local maximums contained in the histogram.

3. The position detection system according to claim 1, wherein the learning data includes the first image and previous learning data used to generate the learned model.

4. The position detection system according to claim 1, wherein the at least one processor of the server generates a size reduced model by reducing a size of the relearned model by at least one of pruning and quantization.

5. The position detection system according to claim 4, wherein the at least one processor of the server generates a compressed model by compressing the size reduced model, and
transmits the compressed model to the position detection apparatus.

6. The position detection system according to claim 1, wherein the processor is further configured to compress the captured images, and
transmit the compressed captured images to the server.

7. A position detection apparatus device comprising:
an image capture device that captures images of a range including an operation surface: and
processor configured to detect a pointed position at which a pointing clement is pointing on the operation surface by using a learned model based on captured images captured by the imaging apparatus,
create a histogram of luminance values of each of the captured images. detect a first image that does not contain the pointing element out of the captured images
based on the number of local maximums contained in the histogram, generate learning data containing the first image, and relearn the learned model using the generated learning data.

8. A position detection method comprising: capturing an image of a range including an operation surface; detecting a pointed position at which a pointing element is pointing on the operation surface by using a learned model based on captured images captured by the imaging;
creating a histogram of lumimance values of each of the captured images,
detecting a first image that does not contain an image of the pointing element out of the captured
images based on the number of local maximums contained in the histogram:
generating learning data containing the first image; and
relearning the learned model by using the learning data.

* * * * *

UNITED STATES PATENT AND TRADEMARK OFFICE
CERTIFICATE OF CORRECTION

PATENT NO. : 11,681,397 B2
APPLICATION NO. : 17/341439
DATED : June 20, 2023
INVENTOR(S) : Takayuki Kitazawa and Yuma Iwahara It is certified that error appears in the above-identified patent and that said Letters Patent is hereby corrected as shown below:

On the Title Page

Item (73), please change the Assignee from "Seiko Epson Corportation, Tokyo (JP)" to "Seiko Epson Corporation, Tokyo (JP)".

Signed and Sealed this
Fifth Day of September, 2023

Katherine Kelly Vidal
*Director of the United States Patent and Trademark Office*